(No Model.)

W. G. CLARK.
CURRY COMB.

No. 335,894. Patented Feb. 9, 1886.

WITNESSES
Geo. A. Darby.
Charles S. Bristnall

INVENTOR
Warren G. Clark
by W E Hagan his atty

UNITED STATES PATENT OFFICE.

WARREN G. CLARK, OF TROY, NEW YORK.

CURRY-COMB.

SPECIFICATION forming part of Letters Patent No. 335,894, dated February 9, 1886.

Application filed September 14, 1885. Serial No. 177,047. (No model.)

*To all whom it may concern:*

Be it known that I, WARREN G. CLARK, of the city of Troy, county of Rensselaer, State of New York, have invented new and useful Improvements in Curry-Combs, of which the following is a specification.

My invention relates to improvements in curry-combs, and which improvements have for their object the arrangement and construction of the blades with alternating scraping and combing portions, so that the operation of cleaning the animal's skin on which the curry-comb is used may be accomplished with less discomfort to the animal than when the curry-comb blades having continuously-serrated edges are employed.

Accompanying this specification, to form a part of it, there is a plate of drawings containing three figures illustrating my invention, with the same designation of parts by reference-letter used in all of them.

Figure 1:
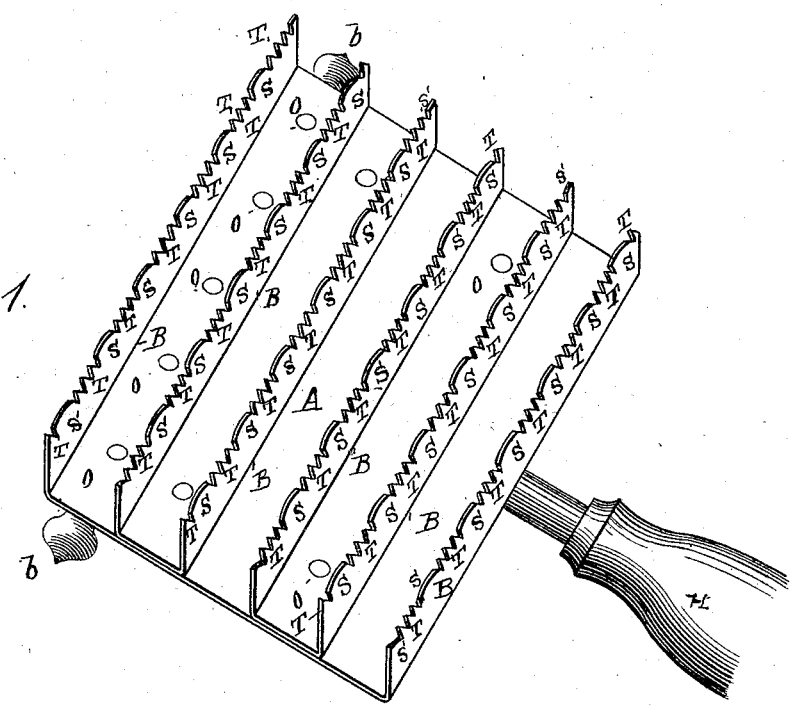
Figure 2:
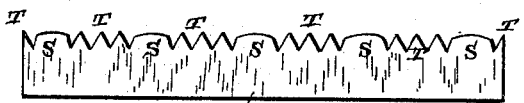
Figure 3:

Of these illustrations, Figure 1 is a perspective of a curry-comb containing my invention. Fig. 2 shows a side elevation of one of the blades, illustrated as detached from the frame. Fig. 3 shows a side elevation of a detached comb-blade containing a modification of my invention.

The several parts of a curry-comb and those parts containing my invention are designated by reference-letters, and the function of the parts is described as follows:

The letter A indicates the frame of the curry-comb; B, its blades, and H its handle. The letter T designates the combing-teeth, which are formed on the outer edges of the blades; and the letter S designates scraping portions, which are also formed on the outer edges of the blades, but arranged between the combing portions. The blades thus constructed are arranged with reference to each other in such a manner that the combing-teeth of each blade shall come horizontally opposite to the scraping portions of the adjacent blades. As thus made, when the implement is rubbed back and forth over the animal's skin, the combing portions of the blades rake out and comb up the scurf and dirt from the hair and skin, and the scraping portions gather it, so that when the implement is tapped on its striking-bar *b* the collected matter is removed. The scraping portions S also serve to regulate the penetration of the combing portions, so as to prevent their injuring the skin by penetrating it too deeply.

Curry-combs made with continuously-serrated blades but slowly gather the scurf and dirt, and the animal's skin is often subjected to more scratching and a deeper raking than is good for it. When, however, the measure of the penetration is regulated by the scraping portions S, this unnecessary irritation of the animal's skin is avoided.

To carry out the purposes of my invention, any known form of comb-teeth may be used, and in such number as is desirable, provided that they are arranged in combination with intermediately-placed scraping-places where there are no teeth.

As illustrated in the accompanying drawings, the blades are shown as made by being struck up from sheet metal in doublets and as riveted to the frame A at O; but as the operation of the blade-edges when containing the alternatingly-arranged scraping and combing parts would be the same whether the blades are attached to the frame as shown or in any other manner, hence I do not limit my invention to the method of attaching the blades which I illustrate and describe.

The function of the frame A being merely to connect and hold the blades with their outer edges as made in a position relatively to each other, as shown and described, I do not limit my invention to the form of frame shown, but make it a condition that the frame or means connecting the blades shall hold them and connect them so that they as made operate substantially in the same manner.

Having thus described my invention, what I claim, and desire to secure by Letters Patent, is—

1. A curry-comb blade provided with combing-teeth arranged on its outer edge, said blade having scraping portions on said outer edge between said combing portions, substantially as and for the purposes set forth.

2. The combination, with the frame A, of the blades B, each of said blades being constructed with the alternatingly-arranged scraping portions S and combing parts T on their outer edges, and with the said blades placed with reference to each other so as to bring the combing and scraping parts of the blades horizontally opposite each other, substantially in the manner as and for the purposes set forth.

Signed at Troy, New York, this 5th day of September, 1885, in the presence of the two witnesses whose names are hereto written.

WARREN G. CLARK.

Witnesses:
CHARLES S. BRINTNALL,
GEO. A. DARBY.